United States Patent [19]

Kudo et al.

[11] Patent Number: 5,037,796

[45] Date of Patent: Aug. 6, 1991

[54] PROCESS FOR PRODUCING HYDRATED AND CURED PRODUCT OF LIME-GYPSUM-COAL ASH MIXTURE

[75] Inventors: Satoshi Kudo; Tsutomu Ueno, both of Sapporo; Tadaaki Mizoguchi, Kure; Takanori Kuwahara; Tsukasa Nishimura, both of Kure, all of Japan

[73] Assignees: The Hokkaido Electric Power Company, Inc.; Babcock-Hitachi Kabushiki/Kaisha, both of Tokyo, Japan

[21] Appl. No.: 419,197

[22] Filed: Oct. 10, 1989

[30] Foreign Application Priority Data

Oct. 24, 1988 [JP] Japan .................... 63-267487

[51] Int. Cl.$^5$ .................... B01J 20/08; B01J 20/10
[52] U.S. Cl. .................... 502/407; 502/414; 502/517
[58] Field of Search ............. 502/517, 407, 413, 414

[56] References Cited

U.S. PATENT DOCUMENTS 4,204,945  5/1980  Flanders et al. .................... 502/517

FOREIGN PATENT DOCUMENTS

| 69145 | 4/1984 | Japan | 502/407 |
| 3036834 | 2/1988 | Japan | 502/407 |
| 3156145 | 6/1988 | Japan | 502/414 |

Primary Examiner—Carl F. Dees
Attorney, Agent, or Firm—Fay, Sharpe, Beall, Fagan, Minnich & McKee

[57] ABSTRACT

A process for producing a hydrated and cured product of a lime-gypsum-coal ash mixture capable of constituting a high-performance desulfurizing agent, with a high yield and in a simplified manner is provided, which process comprises adding water to a mixture of lime, used desulfurizing agent and coal ash, followed by kneading the resulting mixture, then extruding the resulting kneaded material through a hole of 2 to 10 mm in diameter to obtain bullet-like materials, hydrating and curing said bullet-like materials, followed by drying.

7 Claims, 4 Drawing Sheets

PROCESS FOR PRODUCING HYDRATED AND CURED PRODUCT OF LIME-GYPSUM-COAL ASH MIXTURE

BACKGROUND OF THE INVENTION

1. Field of the Invention

This invention relates to a process for producing a hydrated and cured product of a lime-gypsum-coal ash mixture as a gas-purifying agent. More particularly is related to a process for producing a highly effective desulfurizing agent.

2. Description of the Related Art

Removal of sulfur oxides discharged from heavy oil combustion or coal combustion boilers provided in thermal power stations has been carried out according to a wet process (e.g. limestone-gypsum process) or a dry process. However, development of a simplified and economical desulfurization process in place of the above-mentioned processes has been desired.

On the other hand, in the case of coal combustion boilers, an enormous quantity of coal ash has been discharged and a part thereof has been utilized as a material to be incorporated into cement or for land reclamation, but in order to achieve a higher level utilization of the coal ash, its utilization for a dry desulfurizing agent has been developed by the present inventors (Japanese patent application laid-open No. Sho 61-209038/1986).

The desulfurizing agent making use of coal ash is produced basically by adding water to a raw material mixture consisting of slaked lime, gypsum and coal ash, followed by heating the resulting slurry in steam atmosphere to hydrate and cure it, and subjecting the resulting material to grinding treatments, classifying and drying (one step cure process, see FIG. 2). Thus obtained desulfurizing agent is of a porous and hardened material and has a specific feature of fixing $SO_2$ contained in exhaust gases into a chemically stable $CaSO_4$ to remove it, as shown in the following formula (I):

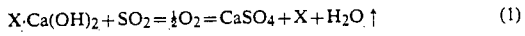

$$X \cdot Ca(OH)_2 + SO_2 = \tfrac{1}{2}O_2 = CaSO_4 + X + H_2O \uparrow \quad (1)$$

wherein X refers to constituents of the agent other than $Ca(OH)_2$.

However, in order to bring a dry desulfurization process into practical use, it is very important to establish a technique of producing a highly active desulfurizing agent in a large scale and with a high yield.

In reference to the above process, there has been developed a process of once heating the raw material mixture to form a hydrated and cured one, followed by roughly grinding it, granulating the resulting ground material and subjecting this material to a secondary cure, thereby improving the yield of product and also shorten the period of time required for production (Japanese patent application laid-open No. Sho 62-254824/1987, two step cure process, see FIG. 3). However, the desulfurization performance of the resulting agent has been somewhat inferior to that in the case of the above one step cure process as a basic production process. Further, in the aspect of a production process, a more simplified process is desired.

SUMMARY OF THE INVENTION

The object of the present invention is to provide a process for producing a hydrated and cured product of a lime-gypsum-coal ash mixture providing a high-performance desulfurizing agent, with a high yield and in a simplified manner.

The present invention resides in:

a process for producing a hydrated and cured product of a lime-gypsum-coal ash mixture, which process comprises adding water to a mixture of lime, used desulfurizing agent obtained after a hydrated and cured product of a lime-gypsum-coal ash mixture has been contacted with a sulfur oxide-containing gas, and coal ash followed by kneading the resulting mixture, then extruding the resulting kneaded material through a nozzle plate having a hole of 2 to 10 mm in diameter to obtain bullet-like materials, hydrating and curing said bullet-like materials, followed by drying.

DETAILED DESCRIPTION OF PREFERRED EMBODIMENTS

The basic raw materials used in the present invention is a mixture of lime, gypsum and coal ash, and typically slaked lime $(Ca(OH)_2)$, gypsum dihydrate $(CaSO_4 \cdot 2H_2O)$ and coal ash. In this case, in order that the finally obtained hydrated and cured product exhibits an aimed desulfurizing performance, water should be added in at least 30 parts by weight or more, preferably 40 parts by weight or more based on 100 parts by weight of starting raw materials. However, such a mixture of raw materials with water represents a slurry-form and it is impossible to apply it to a direct molding.

Thus, there has been proposed a process of heating the raw material slurry to hydrate and cure the slurry, followed by a roughly grinding and then granulating the cured product. However, this two-step cure process including granulation operation, is to be inferior in its performance as compared with that of the one-step cure process, and the reason is considered to result from formation of a dense layer on the surface of the particle at the time of granulation.

The present invention provides a process for producing a desulfurizing agent having a higher performance than that obtained according to the two-step cure process by direct molding of the raw material mixture without granulation.

The present inventors have found that when a used desulfurizing agent is added to the raw material slurry, the hydrating rate of the slurry is so raised up that a direct molding of the slurry is possible, and that the obtained desulfurizing agent is superior in the aspect of desulfurizing performance to that of the prior art.

The present invention have also found that a used desulfurizing agent has a far higher hydrating and cure rate than that of other $CaSO_4$ sources. And when the used desulfurizing agent is added to a raw material as a $CaSO_4$ source, even if the quantity of water added is 40 to 45% which are almost the same values as that in the two-step cure process, it is possible to obtain a hardness at which the above-mentioned raw material mixture can be subjected to extrusion molding only by kneading without precuring.

The used desulfurizing agent can be one obtained after a hydrated and cured product of a lime-gypsum-coal ash mixture has been contacted with a sulfux oxide-containing gas. The above mixture may be anyone obtained by conventional production processes or the process of the present invention.

The present invention will be described in more detail referring to the accompanying drawings.

Figure 1:
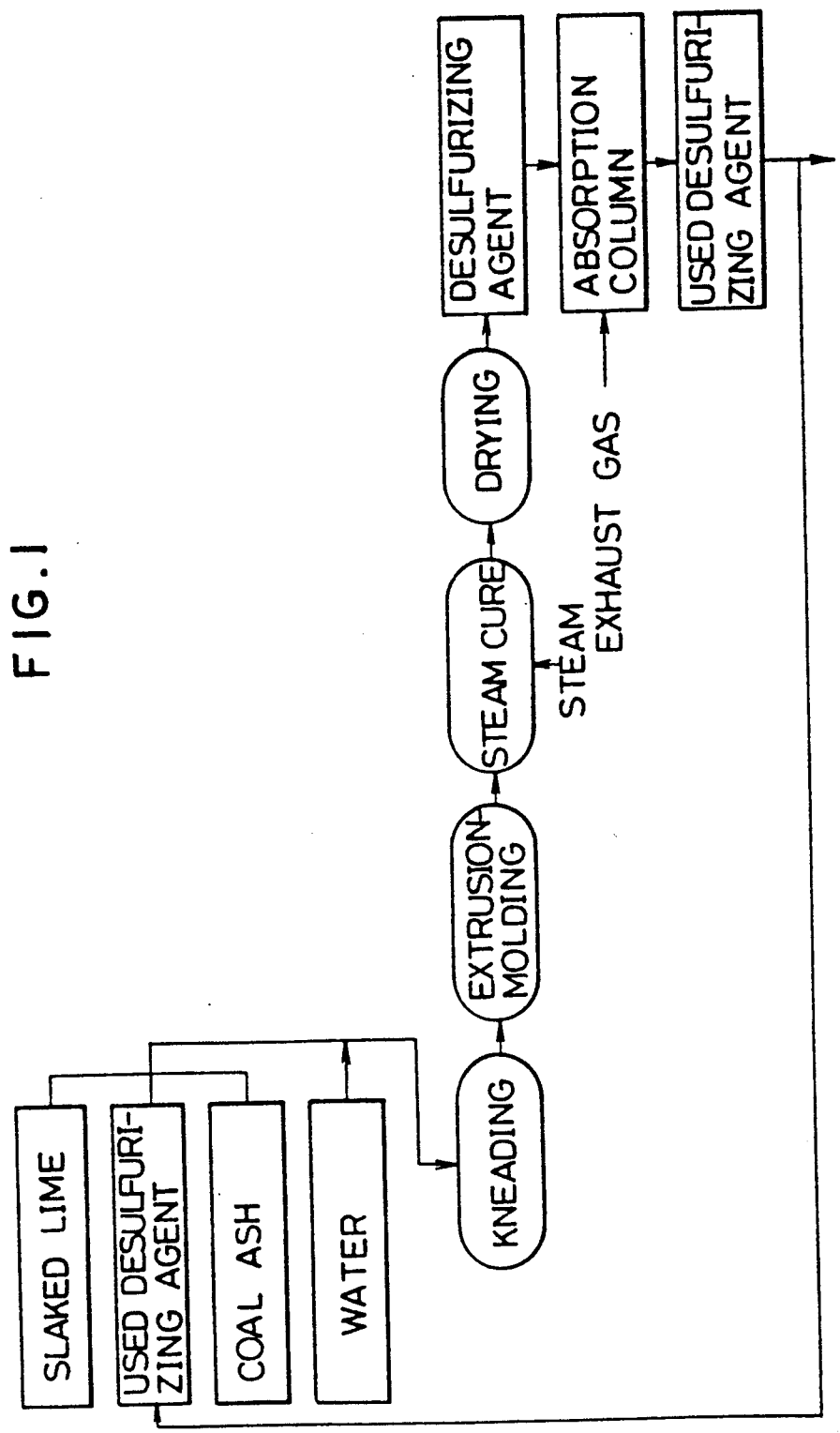
FIG. 1 shows a flowsheet illustrating an embodiment of the process for producing a desulfurizing agent, of the present invention.
Figure 2:
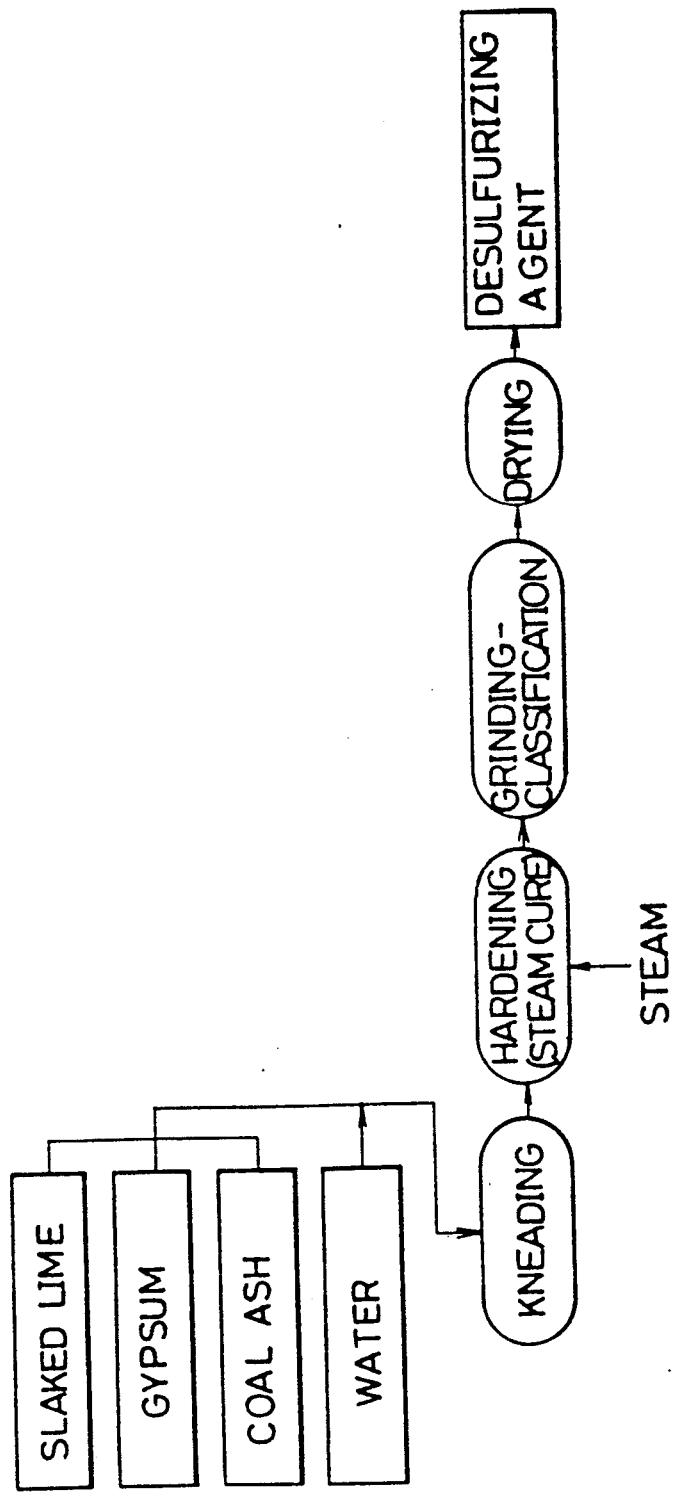
FIG. 2 shows a flowsheet illustrating one-step cure process including grinding and classifying operations among conventional processes for producing a desulfurizing agent.
Figure 3:
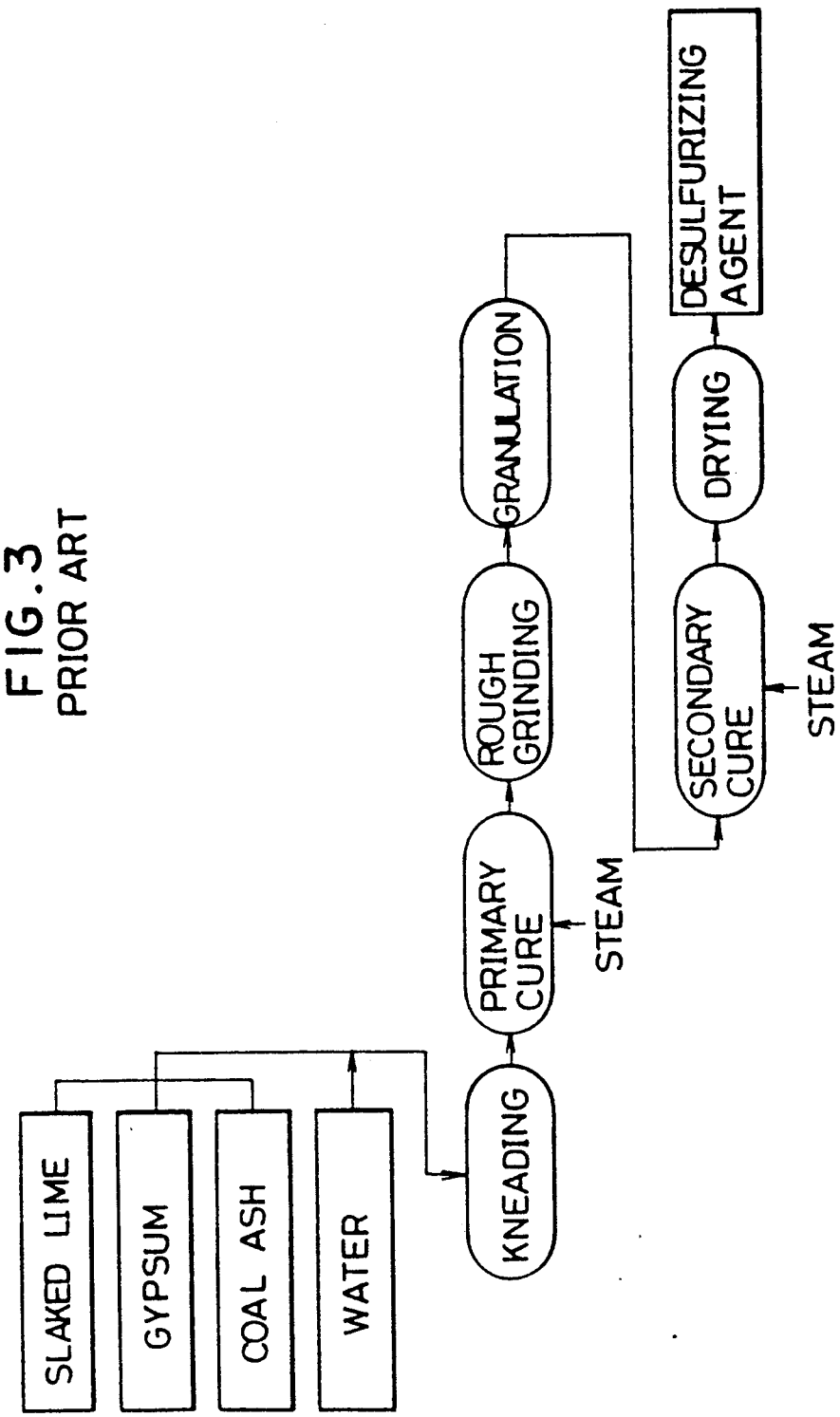
FIG. 3 shows a flowsheet illustrating two-step cure process including a granulation operation among conventional processes.

FIG. 1 shows a flowsheet illustrating production of the desulfurizing agent according to the process of the present invention. The respective mixing proportions of slaked lime ($Ca(OH)_2$), gypsum (calculated in terms of $CaSO_4$) and coal ash as raw materials for producing the desulfurizing agent are preferably in the ranges of 15 to 70 (preferably 15 to 50) parts by weight, 5 to 40 (preferably 5 to 20) parts by weight and 10 to 80 (preferably 30 to 80) parts by weight, respectively. In addition, quick lime (CaO) may be used in place of slaked lime as a main material to be reacted with $SO_2$, and in this case there is an advantage that heat is generated at the time of kneading to increase the hydrating and curing rate. On the other hand, as the $CaSO_4$ source, a used desulfurizing agent is suitable for attaining the object of the present invention. Namely, when a used desulfurizing agent is used as a $CaSO_4$ source, the hydrating and curing rate at the time of kneading is far higher than those in the case where gypsum dihydrate is used as the $CaSO_4$ source, and when anhydrous gypsum having the same form as that contained in a used desulfurizing agent is used, the hydrating and curing rate is also far lower than that in the case where a used desulfurizing agent is used. The effectiveness of the used desulfurizing agent is described more precisely later.

The raw material mixture consisting of slaked lime, used desulfurizing agent and coal ash is subjected to dry-mixing, if necessary, and then water is added to the mixture, followed by kneading. The quantity of water added should be determined taking into account not only the $SO_2$ absorptivity of the resulting desulfurizing agent but also the product yield, the strength, the processability, etc. of the desulfurizing agent. The quantity of water added for achieving mostly the effectiveness of the present invention is in the range of 30 to 45 parts by weight, preferably 35 to 42 parts by weight based on 100 parts by weight of the raw material mixture (dry basis). As the water added at the time of kneading, those having a quality of industrial grade are usable without any particular problem. If the quantity of water added is less than 30% by weight, a state of being dry and loose is formed at the time of mixing to decrease the product yield and lower the strength of the resulting desulfurizing agent. On the other hand, if the quantity of water added exceeds 45% by weight, when the kneaded materials are applied to an extruder, the resulting products stick to one another so that a proper desulfurizing agent cannot be obtained. Further, if the quantity of water added is increased, the quantity of water to be removed by drying naturally increases, resulting in a disadvantage in the aspect of heat economy. In addition, a substance known as a setting-promoting agent of cement such as water glass, $CaCl_2$, NaOH, KOH, $Na_2SO_4$, $Na_2CO_3$, $K_2CO_3$, silicagel etc. may be added at the time of kneading. In this case, the hydrating and curing rate is increased, but a cost for production is raised up due to the additive.

The kneading time of the raw material mixture is controlled so as to make the composition uniform and also bring about the value of the hardness of the resulting kneaded materials into a definite value. The hardness can be evaluated easily by a penetration test measuring the degree of penetration. The degree of penetration is defined as a depth (mm) by which a needle of 1 mm in diameter penetrates at a load of 50 g applied thereto for 5 seconds, and it indicates that the less the value, the harder the sample. In this invention, when the degree of penetration is 150 or less, a hardness that the resulting kneaded material is endurable to extrusion-molding operation is attained. On the other hand, if the resulting kneaded material is too hard, its feed to extruder is not only impossible, but also kneading and extruding operations themselves are impossible to carry out. A preferable degree of penetration is in the range of 50 to 150.

In the case where the kneaded material is extrusion-molded according to the present invention, the allowable range of the hardness is notably broadened as compared with that in the case of granulation molding. This fact is a great specific feature. Namely, in the case where a conventional granulation operation is carried out, a phenomenon occurs that particles collide with one another to coalesce and also since particles is subjected to a rolling motion on the inner wall surface of a granulator, water exudes onto the particle surface. Thus, during the granulating operation, particles are liable to stick to one another; hence it is necessary to reduce the quantity of water added or to reduce the quantity of free water in advance by cure operation. In order to make possible the granulation-molding of $Ca(OH)_2$-$CaSO_4$-coal ash-water mixture or hydrated and cured products thereof, for example, the degree of penetration is desirable to be in the range of 50 to 100. However, according to an extrusion process of the present invention, it is possible to handle even a softer kneaded material having a degree of penetration of less than 150 as compared to the granulation-molding process without any exuding of water.

In the present invention, a kneaded material having a suitable degree of penetration is then fed to an extruder and extruded through a nozzle having a hole of 2 to 20 mm, preferably 2 to 10 mm in diameter. The extruded material is broken bullet-like materials having a length of about 5 to 30 mm. A proper size of the desulfurizing agent is determined taking into consideration of not only the desulfurization performance but also the pressure loss, etc. at the time when the agent is filled in the absorption column and the gas to be treated is fed. That is, the rate-determining process of the $SO_2$ absorption reaction with the products of the present invention generally corresponds to the process during which $SO_2$ molecules diffuse through the inside of the desulfurizing agent so that the smaller the particle diameter of the desulfurizing agent, the better the absorption performance, but on the other hand, the pressure loss exhibited at the time of gas passing through the absorption column increases; hence there is an a suitable range of particle diameter. In the present invention, a hole diameter of a nozzle plate attached to the extruder is designed in the range of 2 to 10 mm.

The extruder for extrusion-molding in the present invention has no particular limitation, but a nozzle plate attached to the extruder is important for determining the performance of the resulting desulfurizing agent.

It is preferred in the present invention that the kneaded material in the extruder is extruded to form a strand and then naturally cut by its self-weight to form a bullet-like material having a length of about 5 to 30 mm; In order to obtain such a material, the thickness of the nozzle plate is preferably in the range of 1 to 5 mm. If the thickness plate is too large, the extruded material forms a long strand like a noodle, thus a cutting process should be added to feed it to the desulfurization apparatus.

If the kneaded material is ground into powder or a small mass, followed by molding operation such as granulation, as in the case of the prior art, water exudes onto the particle surface and also a dense layer is formed so that the activity of the agent is much reduced. On the contrary, according to the present invention, a broken surface formed at the time of extrusion-molding improves the activity of the desulfurizing agent, but also the surface corresponding to the outer periphery is activated. Namely, in a microscopic view, the extrusion process follows the course mentioned below. The kneaded material is extruded discontinuously such that but after it has been extruded by a length of micron unit, it stops in a moment and is again extruded by a length of micron unit, and somewhat expands in a time when it is withdrawn from the plate. Thus the surface of the extrudate is never in a smooth state, but in a scaly state in a micro scopic view. It is a great characteristic of the extrusion-molding process of the present invention that scaly projections and depressions are formed on the surface of the extruded material. In addition, such formation of scaly surface makes easy the diffusion of gas into the inside of particles. The surface properties of the extrudate vary depending on the water content of the kneaded material, the plate thickness of the nozzle plate of the extruder, etc., and the water content for obtaining an extrudate having desirable properties as the desulfurizing agent is 30 to 45%, preferably 35 to 42%.

On the other hand, the smaller the plate thickness of the mold of the extruder, the lower the extrusion pressure. In the case where the extrusion pressure is low, the extrudate has a rough particle packing to afford a porous desulfurizing agent of low density as compared with the case of extrusion through a thick nozzle plate.

The extrudate that is in the form of bullet-like materials, if necessary, can be broken further or freed from fine particles, followed by subjecting it to steam cure and then to drying treatment to obtain a desulfurizing agent of the present invention.

The reason why the addition of a used desulfurizing agent promotes the hydrating and curing rate is considered as follows:

Namely, it is considered that when the hydrated and cured products of a $Ca(OH)_2$-$CaSO_4$-coal ash composition is formed, the role of the coal ash consists in that the coal ash feeds $Al_2O_3$ and/or $SiO_2$ to form a compound of $Ca(OH)_2$-$CaSO_4$-M-$H_2O$ wherein M represents $Al_2O_3$ and/or $SiO_2$.

When the compound of $Ca(OH)_2$-$CaSO_4$-M-$H_2O$ absorbs and oxidizes $SO_2$, $CaSO_4$ is formed according to the following reaction and at that time, M is freed (regenerated):

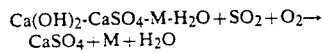

When the used desulfurizing agent is used as a $CaSO_4$ source, M has already been contained therein and even if M is not freshly dissolved out from the coal ash, the hydrating and curing reaction of $Ca(OH)_2$-$CaSO_4$ mixture proceeds easily.

Whereas, when gypsum dihydrate ($CaSO_4 \cdot 2H_2O$), hemihydrate gypsum ($CaSO_4 \cdot \frac{1}{2}H_2O$), anhydrous gypsum ($CaSO_4$) or the like is used as a $CaSO_4$ source, the formation reaction of the compounds of $Ca(OH)_2$-$CaSO_4$-M-$H_2O$ do not occur so long as M is dissolved out of the coal ash; hence the reaction rate becomes notably low as compared with the case where the used desulfurizing agent is used as a $CaSO_4$ source. As described above, the case of use of the used desulfurizing agent as a $CaSO_4$ source is essentially different in the formation mechanism of the hydrated and cured product from the case of using the other $CASO_4$ sources. As previously described, when granulation-molding in the prior art is operated, a phenomenon occurs that water exudes onto the particle surface. Since such water contains soluble salts, a dense layer containing the soluble salts is formed on the particle surface during the proceeding of curing (hydration and hardening) so that diffusion of $SO_2$ into the inside of the resulting desulfurizing agent is hindered. Further, since the used desulfurizing agent contains components which have once exuded from coal ash such as Na, K, Mg, Mn, etc., the concentration of soluble salts in water exuding onto the particle surface at the time of granulation operation is higher than that in the case of using gypsum as a $CaSO_4$ source so that the particle surface of the resulting desulfurizing agent becomes denser, which results in a notable reduction in the desulfurizing performance.

In addition, when the extrusion-molding of the present invention is carried out, the particle surface becomes scaly as described above, while granulation-molding is operated, the surface not only forms a smooth surface, but also a dense layer is formed as described above; hence $SO_2$ absorptivity lowers.

In the process for producing the cured product of the present invention, factors affecting the properties thereof include composition of raw material mixture, quantity of water added, dimension of the nozzle of extruder and vapor pressure, temperature, time, etc. at the time of curing. Among these, as a condition under which a gas-purifying agent having a high performance is produced, the cure time is important and preferred within 24 hours, more preferably to be 9 to 15 hours.

The cure of the extrusion-molded material is carried out in a curing apparatus with a steaming means. When the materials to be cured are heaped highly, they are liable to stick to one another at the lower part of the heaped materials during the cure. In order to prevent this problem, it is preferred that the height of the heaped materials is increased as the cure proceeds. For example, when cure is carried out at a height of the heaped layer of 25 to 50 mm until one hour after the start of cure, followed by raising the height of the heaped layer up to 200 mm or more to carry out further cure, then it is possible to be freed from the sticking of resulting molded materials and also to make the cure apparatus compact.

The present invention will be described in more detail by way of examples, but it should not be construed to be limited thereto.

EXAMPLES 1-5

Water (45 parts by weight) was added to a mixture consisting of slaked lime ($Ca(OH)_2$) (30 parts by weight), gypsum dihydrate (12 parts by weight, based on $CaSO_4$) and coal ash (58 parts by weight), followed by mixing these materials for 2 minutes, steam-curing the resulting mixture at 100° C. for 2 hours, passing the resulting hardened material through a sieve having a mesh opening of 6.7 mm to prepare seeds for granulation, granulating by means of a dish type granulator, again steam-curing the resulting granulated material at 100° C. for 12 hours, drying the resulting cured material and heating at 130° C. for 2 hours to obtain a desulfurizing agent.

This desulfurizing agent (64 kg) was filled in a 100 l capacity cylindrical reactor, followed by passing exhaust gases from a coal combustion power boiler, consisting of $SO_2$ (460 ppm), $NO_x$ (250 ppm), $O_2$ (9%), $CO_2$ (11%), $H_2O$ (8%) and $N_2$ (balance), through the reactor until free alkalis contained in the desulfurizing agent were almost consumed, to obtain a substance referred to herein as "used desulfurizing agent". The composition of the used desulfurizing agent was as follows:
$SiO_2$: 30.2%, $Al_2O_3$: 12.0%, $CaO$: 21.0%, $MgO$: 1.13%, $Na_2O$: 0.46%, $K_2O$: 1.17%, $Fe_2O_3$: 2.32%, $SO_3$: 23.0% and
$CO_2$: 0.97% (percentage by weight).

Next, water in 30, 35, 40, 42 or 45 parts by weight was added to a mixture consisting of the used desulfurizing agent (38 parts by weight) (16 parts by weight in terms of $CaSO_4$, but all of $SO_3$ being regarded as present in the form of $CaSO_4$), slaked lime (30 parts by weight) and coal ash (32 parts by weight), followed by kneading these materials, stopping the kneading when the hardness of the resulting raw material paste reached a degree of penetration of 100, extruding the resulting kneaded material through a nozzle plate having a hole of 6 mm in diameter and a thickness of 2.2 mm obtaining bullet-like extrudates, placing the resulting extrudates in a vessel having a bottom surface of metal gauze, heating and cooling them in steam at 100° C. for 15 hours, and drying the resulting materials followed by heating at 130° C. for 2 hours to prepare a desulfurizing agent. Particles of about 6 mm in diameter and about 10 mm in length were chosen from among those of the desulfurizing agent, followed by placing 4 g of the above-mentioned particles on a perforated plate in a reaction tube of 30 mm in diameter, and passing a gas having the following composition therethrough at 130° C. at a flow rate of 2l/min.:
$SO_2$: 1,000 ppm, $NO$: 200 ppm, $CO_2$: 12%, $O_2$: 6%, $H_2O$: 10% and $N_2$: balance.

Portions of the sample of the desulfurizing agent were withdrawn at each definite time and the quantity of remaining alkalis was analyzed to obtain the percentage utilization of CaO. The results were as follows.

| Quantity of Water added (%) | Percentages utilization of CaO (%) |
| --- | --- |
| 30 | 89.3 |
| 35 | 90.0 |
| 40 | 92.9 |
| 42 | 96.0 |
| 45 | 92.6 |

Further, the relationship between the reaction time and the percentage utilization of CaO with a desulfurizing agent prepared in a quantity of water added of 40% was sought. The results were as follows.

| Reaction time (hours) | Percentage utilization of CaO (%) |
| --- | --- |
| 6 | 65.6 |
| 25 | 88.0 |
| 50 | 92.9 |
| 75 | 93.9 |
| 100 | 95.1 |

In addition, the relationship between the characteristics other than $SO_2$ absorptivity, of the desulfurizing agent and the quantity of water added at the time of its preparation is shown in Table 1.

TABLE 1

| Example | Amount of water added (%) | Product yield (%) | Strength (kg) | Pore volume (ml/g) | Specific surface area (m²/g) |
| --- | --- | --- | --- | --- | --- |
| No. 1 | 30 | 82 | 3.6 | 0.180 | 37.5 |
| No. 2 | 35 | 86 | 3.2 | 0.195 | 39.7 |
| No. 3 | 40 | 92 | 2.9 | 0.223 | 40.9 |
| No. 4 | 42 | 95 | 2.9 | 0.228 | 41.5 |
| No. 5 | 45 | 97 | 3.3 | 0.231 | 42.2 |

EXAMPLES 6-9

Water (40 parts by weight) was added to a mixture consisting of the same used desulfurizing agent as in Examples 1-5 (38 parts by weight) (16 parts by weight in terms of $CaSO_4$), slaked lime (30 parts by weight) and coal ash (32 parts by weight), followed by the same operations as in Examples 1-5 to prepare a desulfurizing agent. In this case, the steam cure time was changed to 9, 15, 20 or 24 hours. As a result, the percentages utilization of CaO during a desulfurization reaction time of 50 hours were as follows.

| Steam cure time (hrs.) | Percentage utilization of CaO |
| --- | --- |
| 9 | 86.3% |
| 15 | 92.9 |
| 20 | 95.5 |
| 24 | 93.9 |

EXAMPLES 10-12

Water (40 parts by weight) was added to a mixture consisting of the same used desulfurizing agent as in Examples 1-5 (38 parts by weight) (16 parts by weight in terms of $CaSO_4$), slaked lime (30 parts by weight) and coal ash (32 parts by weight), followed by the same procedures as in Examples 1-5 to prepare desulfurizing agents. In this case, the thickness of the nozzle plate of the extruder was made 2.2, 3.2 or 8.5 mm. As a result, the percentages utilization of CaO during a desulfurization reaction time of 50 hours were 92.9, 91.5 and 90.3%, respectively.

On the other hand, the relationship between the characteristics other than the $SO_2$ absorptivity, of the desulfurizing agent and the preparation conditions thereof is shown in Table 2. As seen from the Table, the less the thickness of the nozzle plate used, the more improved the initial $SO_2$ absorptivity of the resulting desulfurizing agent, but the strength is somewhat reduced.

TABLE 2

| Example | Plate thickness (mm) | Strength (kg) | Average length of desulfurizing agent (mm) |
|---|---|---|---|
| No. 10 (=3) | 2.2 | 2.9 | 14.1 |
| No. 11 | 3.2 | 3.2 | 21.3 |
| No. 12 | 8.5 | 4.8 | 28.6 |

COMPARATIVE EXAMPLE 1

Hot water (40 parts by weight) was added to a mixture consisting of slaked lime (30 parts by weight), gypsum dihydrate (16 parts by weight based on $CaSO_4$) and coal ash (54 parts by weight), followed by kneading these materials for 2 minutes. As a result, the degree of penetration of the resulting kneaded material paste was 200. Kneading of the paste was continued further for 10 minutes, but the degree of penetration was 170; thus it was impossible to carry out molding operation such as extrusion as it was. The raw material paste obtained by kneading for 12 minutes in total was spread on a flat plate so as to give a thickness of about 25 mm, followed by placing it in saturated steam at 100° C. for 4 hours to hydrate and harden it, extruding the resulting hardened material through a nozzle plate having a hole diameter of 6 mm and a thickness of 2.2 mm, placing the resulting extrusion-molded material in a vessel having a bottom surface of metal gauze so as to give a height (thickness) of about 25 mm, curing it on heating in steam at 100° C. for 12 hours and drying followed by heating at 130° C. for 2 hours. As a result, the percentage utilization of CaO during a desulfurization reaction time of 50 hours was 86.8%.

COMPARATIVE EXAMPLE 2

Hot water (40 parts by weight) was added to a mixture consisting of the same used desulfurizing agent as in Examples 1-5 (38 parts by weight) (16 parts by weight in terms of $CaSO_4$), slaked lime (30 parts by weight) and coal ash (32 parts by weight), followed by kneading these materials until the hardness of the raw material paste reached a degree of penetration of 100, passing the resulting kneaded and hardened material through a sieve having a sieve opening of 6.7 mm to prepare seeds for granulation, granulating by means of a dish type granulator so that the most part of the resulting granules might have a particle diameter of 3 to 10 mm, curing the granules with steam at 100° C. for 15 hours and drying the cured material followed by heating at 130° C. for 2 hours to prepare a desulfurizing agent. The desulfurizing performance of this desulfurizing agent was examined in the same manner as in Examples 1-6. As a result, the percentage utilization of CaO during a desulfurization reaction time of 50 hours was 85.2%. In addition, according to the present process, the product yield (that of particle diameter: 3 mm or larger) was 95%, the strength of the desulfurizing agent was 8.0 kg, the pore volume was 0.21 ml/g and the specific surface area was 38.0 m²/g. As seen from the above results, when the granulation operation is applied, the product yield and the strength of the desulfurizing agent are increased, but the pore volume and the specific surface area are almost unchanged in spite of the presence or absence of the granulation operation, and on the other hand, when the granulation operation is applied, the desulfurization performance is reduced.

EXAMPLE 13

Water (40 parts by weight) was added to a mixture consisting of $Ca(OH)_2$ (30 parts by weight), the same used desulfurizing agent as in Examples 1 to 5 (38 parts by weight) (16 parts by weight in terms of $CaSO_4$) and coal ash (32 parts by weight), followed by kneading. The resulting kneaded material was extruded through a nozzle plate having a hole diameter of 6 mm and thickness of 2.2 mm, followed by heaping the extruded materials in a vessel having a bottom surface of metal gauze, and curing the materials at a temperature of 95° C. for 15 hours, increasing the height of the heaped materials as 50, 150 and 250 mm.

As a result, it was found that, when the height of heaped materials was raised up to 150 mm or 250 mm, sticking of the molded materials to one another occurred at the bottom part of metal gauze.

Thus, when cure was carried out for 0.5, 1 or 2 hours at a height of heaped materials of 50 mm, followed by curing at a height of heaped materials of 250 mm, no sticking was occurs in either cases.

Thus, it was found that when the extrusion-molded materials were at first cured for 0.5 hour, preferably one hour at a height of heaped materials of 50 mm to carry out hydration and curing to a certain extent, followed by curing at a height of heaped materials raised up to 250 mm, then no adhesion of the molded materials at the time of curing occurs to obtain an active hydrated and cured product.

Figure 4:
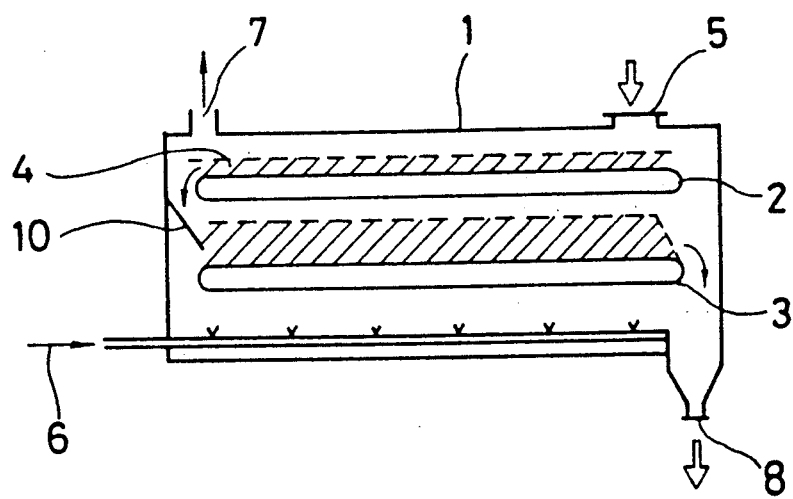
FIG. 4 shows a view illustrating an embodiment of an apparatus for curing employed in the present invention.

FIG. 4 shows an embodiment of the structure of a steam cure apparatus invented based on the results of Example 13. Cure apparatus 1 contains belt conveyers separated into a first belt conveyer 2 and a second belt conveyer 3, extrusion-molded materials 4 from feeding port 5 are quantitatively fed onto the first belt conveyer 2. On the first belt conveyer 2, steam cure is carried out for one hour while the moving rate of the belt is adjusted so as to retain the height of heaped extruded materials of 25 to 50 mm. The resulting cured material is then fed onto the second belt conveyer 3 sliding on a guide plate 10. On the second belt conveyer 3, steam curing is further carried out, while the moving rate of the belt is adjusted so as to give a height of heaped extruded materials of 200 to 300 mm. In addition, steam is fed out of a piping provided at the bottom part of the apparatus via steam-feeding port 6 to cure the extruded materials, and withdrawn from exhaust vent 7 provided at the upper part of the apparatus 1. The extruded materials having finished curing are withdrawn from withdrawing port 8 and led to a drying step to obtain a desulfurizing agent. A cure apparatus of a rotating disc type can be used instead of the above apparatus.

According to the present invention, steam-curing operation which has so far been basically carried out in two steps can be carried out in one step by adding a used desulfurizing agent to raw materials mixture, and it is possible to produce a hydrated and hardened materials of $Ca(OH)_2$-$CaSO_4$-coal ash mixture without any granulation operation and with a high yield. Further, the performance of the resulting hydrated and hardened materials as a desulfurizing agent is superior to that obtained in the prior art process.

What we claim is:

1. A process for producing a hydrated and cured product of a lime-gypsum-coal ash mixture, which process comprises adding water to a mixture of from about 15 to 70 parts weight lime, about 5 to about 40 parts by weight used desulfurizing agent obtained after a hydrated and cured product of a lime-gypsum-coal ash mixture has been contacted with a sulfur oxide containing gas, and about 10 to about 80 parts by weight coal ash, said water comprising from about 30 to about 45 parts by weight per 100 parts by weight of said mixture followed by kneading the resulting mixture, then extruding the resulting kneaded material through a nozzle plate to obtain extruded pellets, hydrating and curing said pellets, followed by drying.

2. A process for producing a hydrated and cured product of a lime-gypsum-coal ash mixture according to claim 1, wherein said nozzle plate has a hole of 2 to 10 mm in diameter.

3. A process for producing a hydrated and cured product of a lime-gypsum-coal ash mixture according to claim 1, wherein said mixture after kneading has a hardness defined as a degree of penetration being in the range of 50 to 150.

4. A process for producing a hydrated and cured product of a lime-gypsum-coal ash mixture according to claim 1, wherein said pellets have a diameter in the range of 1 to 15 mm and a length in the range of 5 to 30 mm.

5. A process for producing a hydrated and cured product of a lime-gypsum-coal ash mixture according to claim 1, wherein said nozzle plate has a thickness in the range of 2 to 10 mm.

6. A process for producing a hydrated and cured product of a lime-gypsum-coal ash mixture according to claim 1, wherein said extruded materials are subjected to cure treatment in steam within 24 hours.

7. A process for producing a hydrated and cured product of a lime-gypsum-coal ash mixture according to claim 2, wherein in said cure treatment, said extruded materials to be cured are heaped in a an apparatus having a streaming means and the height of the resulting heaped materials is increased as the curing proceeds, thereby preventing the materials from sticking one to another.

* * * * *